Nov. 15, 1966   D. L. ROBERTS   3,285,314
METHOD OF MAKING A LIGHT COLORED SIDEWALL TIRE
AND ARTICLE PRODUCED THEREBY
Filed Feb. 4, 1963

INVENTOR.
DONALD L. ROBERTS
BY
J. B. Holden
ATTORNEY

United States Patent Office 3,285,314
Patented Nov. 15, 1966

3,285,314
METHOD OF MAKING A LIGHT COLORED SIDE-
WALL TIRE AND ARTICLE PRODUCED THERE-
BY
Donald L. Roberts, Cuyahoga Falls, Ohio, assignor to
The Goodyear Tire & Rubber Company, Akron, Ohio,
a corporation of Ohio
Filed Feb. 4, 1963, Ser. No. 255,852
7 Claims. (Cl. 152—353)

This invention relates to a method of forming the sidewall of a vehicle tire from a relatively dark rubber stock, usually black, and a lighter colored rubber stock, usually white.

It has been necessary to buff and clean white sidewall tires after curing, since in the various steps of transporting the tire from the tire building machine to the tire mold and, thereafter, to inspection, the exposed area of the white sidewall becomes soiled, scuffed, and marked due to handling, contact with the mold surfaces and other equipment.

It has been conventional practice in the manufacture of white sidewall tires to buff and clean the vulcanized exposed white sidewall area and, thereafter, to wrap the tire with a protective paper covering, or to spray the white sidewall area with a water-soluble paint. Applying some protective covering to the finished tire has been necessary to insure that the tire is received by the customer with a clean, unscuffed, and unmarked white sidewall.

In accordance with the present invention, the exposed or externally visible area of lighter colored stock, or white stock, in the sidewall of the tire is covered with a protective strip of material when the tire is unvulcanized, preferably at the tire building machine, and is retained in such position through the vulcanizing operation to insure that such defects in the white sidewall of the tire will not occur.

The primary object of the present invention is to provide a novel method of making a tire from a relatively dark colored rubber stock and a lighter colored rubber stock, preferably white, in the sidewall to eliminate the necessity of buffing and cleaning the white sidewall areas after curing, to protect the white sidewall area from scuffing and soiling until the tire reaches the customer, and to provide a smooth surface to the white sidewall area.

Other objects and advantages of the present invention will become apparent from the following description when read in conjunction with the accompanying drawings, in which.

Figure 1:
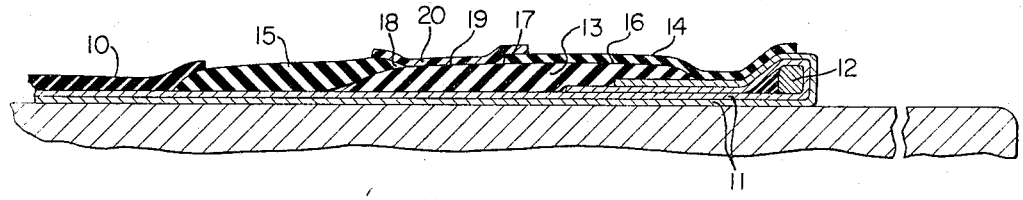
FIG. 1 is a partial sectional view of a raw, unvulcanized tire as fabricated on a tire building drum in accordance with the method of this invention.

Referring to FIG. 1 of the drawings, a partial cross-sectional view of a green tire carcass 10 is shown having a plurality of reinforcing plies 11 turned about the bead 12. A strip of light colored stock 13, preferably white, is as is conventional, permanently adhered to the sidewall of the tire above the bead 12, the lateral edges of which are covered by strips of darker colored stock 14 and 15. The strip 14 covering the edge 16 of the white strip 13 extends from the bead 12 and terminates at 17 in a uniform straight line around the circumference of the green tire. The end 18 of the strip 15 is spaced from the end 17 of the strip 14 to provide an exposed annular area 19 of white stock.

In accordance with this invention, the exposed area of white or light colored stock 19 is covered with a protective strip 20 made of a stretchable material which will not bond to rubber under the condition of vulcanization and which forms a smooth exposed surface in the area 19. The material is stretchable so that as the tire is shaped and cured, the strip 20 is capable of elongating from the position shown in FIG. 1 to the position shown in FIG. 2.

Figure 2:
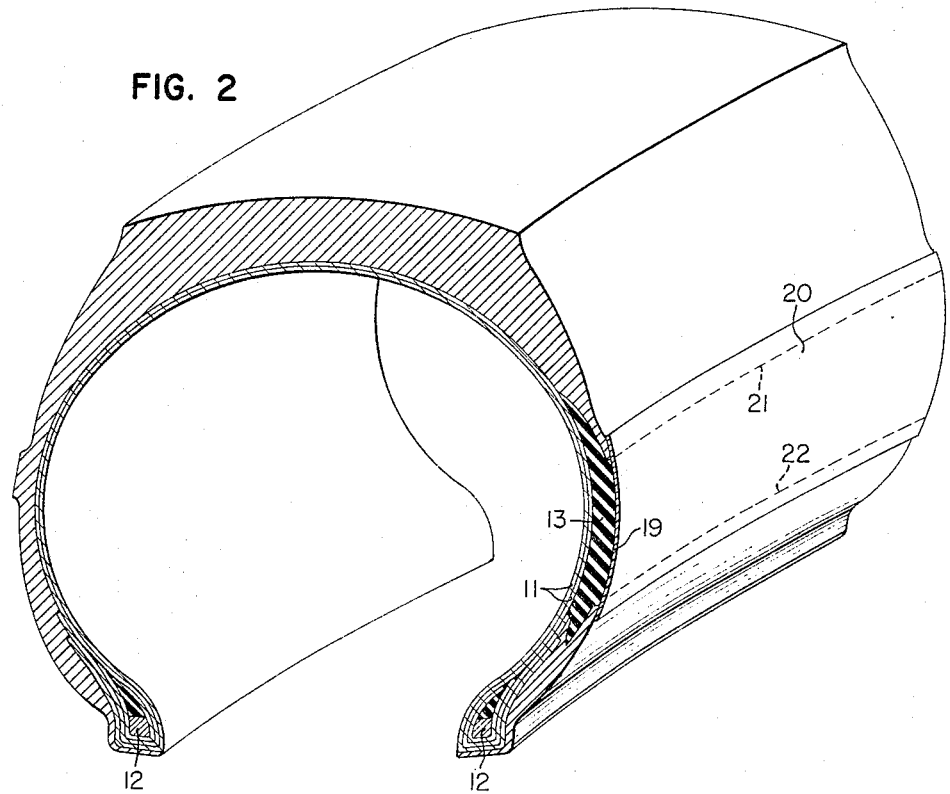
FIG. 2 is a perspective sectional view of a tire formed in accordance with the present invention.

FIG. 2 of the drawings shows the tire after it has been vulcanized in a tire curing mold. It is seen that the strip 20 completely covers both laterally and circumferentially the exposed area 19 of white stock 13. The ends or edges 17 and 18 of the black stock 14 and 15 form uniform lines of demarcation 21 and 22 with the underlying white stock.

After removal of the tire from the vulcanizing mold, the protective layer 19 may be removed for inspection, grading, and transportation. Preferably, the protective layer is transparent and is kept in position over the exposed white area of the tire. Thus, after removal of the protective strip 19, the customer or user of the tire is assured of having a clean and unscuffed white sidewall.

A number of materials may be successfully employed for the protective strip 19, such as butyl rubber or other elastomeric compound which will not bond to the tire compound under the conditions of cure and which can be readily removed after cure. A strip of transparent stretchable resinous synthetic plastic material, such as Mylar or Teflon, is preferred for the strip 19 because films of such materials are stretchable, form a smooth surface on the finished tire, and can readily be made transparent so that the white sidewall area of the tire can be inspected subsequent to cure. Although such films can be adhered or tacked to the green carcass if they are applied with sufficient pressure and the endings of the strip are tacked together, it is preferred that the strips 19, made of synthetic resinous plastic, be provided with a thin, tacky coating of pressure sensitive adhesive, such as described in U.S. Patent 2,973,286, to facilitate their application to the green tire. Obviously, such adhesive should not contain ingredients which will cause the adhesive to permanently bond to the rubber of the carcass of the tire under the conditions of cure.

While certain representative embodiments and details have been shown for the purpose of illustrating the invention, it will be apparent to those skilled in this art that various changes and modifications may be made therein without departing from the spirit or scope of the invention.

What is claimed is:

1. A method of making a sidewall of a tire from a relatively dark colored rubber stock and a lighter colored rubber stock comprising, applying the two stocks in unvulcanized condition to the sidewall of the carcass with at least a part of said lighter colored stock forming an externally exposed and visible area in the sidewall, covering said area with a protective strip of stretchable material which will not permanently adhere to the rubber of the sidewall under the conditions of cure, placing said tire in a curing mold and subjecting the tire to curing conditions.

2. A method as claimed in claim 1 in which said protective strip is made of a transparent synthetic resin.

3. A method as claimed in claim 2 in which said protective strip is tightly wrapped about the circumference of the tire with the ends thereof tacked together.

4. A method as claimed in claim 2 in which said protective strip is provided with a pressure sensitive adhesive disposed on the side of said strip next adjacent said lighter colored stock.

5. A tire having a sidewall made of relatively dark colored rubber stock and a lighter colored stock permanently fixed to said tire with an area of said lighter colored stock normally externally visible, said area of light colored stock being covered with an elongated protective strip of stretchable material longitudinally extending circumferentially of the tire and which is removable and not permanently bonded to said sidewall.

6. A tire as claimed in claim 5 in which said protective strip comprises a synthetic resinous film.

7. A tire as claimed in claim 6 in which said film is adhered to the said sidewall by a pressure sensitive adhesive.

References Cited by the Examiner

UNITED STATES PATENTS

| | | | |
|---|---|---|---|
| 1,458,629 | 6/1923 | Raymond | 152—353 |
| 2,136,567 | 11/1938 | Smith | 152—330 |
| 2,473,784 | 6/1949 | Carlin et al. | 156—247 X |
| 2,685,904 | 10/1954 | Brandau | 156—116 X |
| 2,726,634 | 12/1955 | Horner | 118—505 |
| 3,164,192 | 1/1965 | Kasio et al. | 152—353 |

EARL M. BERGERT, *Primary Examiner.*

HAROLD ANSHER, *Examiner.*